US008508341B2

(12) United States Patent
Kohli et al.

(10) Patent No.: US 8,508,341 B2

(45) Date of Patent: Aug. 13, 2013

(54) ADAPTIVE COMMUNICATION IN AN ELECTRONIC TOLL COLLECTION SYSTEM

(75) Inventors: Japjeev Kohli, Waterloo (CA); Alastair Malarky, Petersburg (CA); Mike Lee, Cambridge (CA)

(73) Assignee: Mar IV Industries Corp., Mississauga, Ontario (CA)

( * ) Notice: Subject to any disclaimer, the term of this patent is extended or adjusted under 35 U.S.C. 154(b) by 434 days.

(21) Appl. No.: 12/727,964

(22) Filed: Mar. 19, 2010

(65) Prior Publication Data

US 2010/0237998 A1 Sep. 23, 2010

Related U.S. Application Data

(60) Provisional application No. 61/161,859, filed on Mar. 20, 2009.

(51) Int. Cl.

| | |
|---|---|
| ***H04Q 5/22*** | (2006.01) |
| ***G08B 13/14*** | (2006.01) |
| ***G08G 1/065*** | (2006.01) |
| ***H04B 15/00*** | (2006.01) |
| ***G06F 19/00*** | (2011.01) |

(52) U.S. Cl.

USPC ... 340/10.1; 340/10.3; 340/10.51; 340/572.1; 340/928; 455/406; 701/117

(58) Field of Classification Search

USPC ........................................................ 340/10.1

See application file for complete search history.

(56) References Cited

U.S. PATENT DOCUMENTS

| | | | | |
|---|---|---|---|---|
| 5,086,389 | A * | 2/1992 | Hassett et al. | 705/13 |
| 7,385,525 | B2 * | 6/2008 | Ho et al. | 340/928 |
| 7,545,287 | B2 * | 6/2009 | Feldman et al. | 340/928 |
| 2007/0075839 | A1 * | 4/2007 | Ho et al. | 340/10.2 |
| 2010/0052948 | A1 | 3/2010 | Vian et al. | |

FOREIGN PATENT DOCUMENTS

| | | |
|---|---|---|
| WO | 0143999 | 6/2001 |

OTHER PUBLICATIONS

International Searching Authority, International Search Report issued for PCT/CA2010/000384, mailed on Jun. 4, 2010, 3 pages.

International Searching Authority, Written Opinion issued for PCT/CA2010/000384, mailed on Jun. 4, 2010, 4 pages.

* cited by examiner

*Primary Examiner* — Jennifer Mehmood

*Assistant Examiner* — John Mortell

(74) *Attorney, Agent, or Firm* — Hanley, Flight & Zimmerman, LLC

(57) ABSTRACT

An adaptive communication system and method for use in an electronic toll collection system utilizing transponders located in vehicles travelling on a toll roadway. A transponder memory stores configuration type data that identifies the type of the vehicle carrying the transponder, the transponder or the transponder's mounting. The transponder transmits the configuration type data to the communication system. The communication system includes a memory which contains a database of predetermined communication parameters for various types of configuration types. The communication system looks up the predetermined communication parameters for the configuration type and adjusts variable communication parameters accordingly. Predetermined communication variables may include the transmit power of an antenna, or the receive sensitivity of the antenna or the position of the vehicle in order to maximize the likelihood of a successful communication.

27 Claims, 5 Drawing Sheets

ADAPTIVE COMMUNICATION IN AN ELECTRONIC TOLL COLLECTION SYSTEM

CROSS-REFERENCE TO RELATED APPLICATIONS

The present application claims priority to U.S. provisional patent application No. 61/161,859 filed Mar. 20, 2009.

FIELD

The present invention relates to electronic toll collection systems and, in particular, to adaptive communications systems and methods for communicating with a transponder in a moving vehicle.

BACKGROUND

Electronic toll collection systems ("ETC") are commonly used to facilitate the collection of a toll from a moving vehicle traveling on a toll roadway.

Automatic Vehicle Identification ("AVI") is the process of determining the identity of a vehicle on the roadway. Typically, electronic toll systems use a series of antennas that are mounted near the roadway which provide coverage areas that extend the width of a lane. Radio frequency ("RF") transponders are mounted on or within a vehicle to communicate with the antennas. A roadside AVI reader typically interrogates the transponder using the antenna. Typically the roadside reader is connected to a vehicle detector and imaging system which permits vehicles to be detected, classified, and photographed, and the license plate numbers analyzed in order to permit the operator of the toll system to apply appropriate charges to the owner of the vehicle.

After the AVI reader has read the data transmitted by the transponder, the reader typically transmits updated information to the transponder using at least one of the antennas. For example, the reader may transmit a record of the plaza and lane for subsequent retrieval at a later toll plaza, or it may transmit information to control audio and visual displays associated with the transponder. The AVI reader also typically re-interrogates the transponder to ensure the updated information has been programmed.

In some circumstances, a transmission problem may occur resulting in a failed programming attempt. For example, the transponder or the AVI reader may not receive a signal if the transponder has traveled outside of the coverage area of the antenna used to transmit the programming signal. Interference caused by other electrical devices may also result in the programming signal or a portion of the programming signal not being received by the transponder. A transmission error may also occur due to reflections, multipath and the attenuation of the RF programming signal as it passes from the exterior of the vehicle to the interior of the vehicle where the transponder is typically located.

It is therefore desirable to provide an improved communication system and method for communicating with a transponder located in a moving vehicle in a toll roadway.

SUMMARY

In one aspect, the present application describes an adaptive communication system for communicating with a transponder located in a moving vehicle travelling on a roadway. The transponder has a transponder memory for storing configuration type data, such as, for example, data including information about the vehicle and/or transponder and/or transponder mounting. The system includes at least one antenna having a coverage area that includes at least a portion of the roadway for receiving the configuration type data from the transponder memory and for transmitting a programming signal. The system further includes a system memory having a database stored thereon. The database lists at least one predetermined communication parameter for each of at least two configuration types. The system further includes a control device connected to the antennas and the system memory. The control device is configured to determine from the database the predetermined communication parameters corresponding to the configuration type data received at the antenna and to subsequently adjust at least one variable communication parameter based on the predetermined communication parameters determined to correspond to the received configuration type data.

In another aspect, the present application provides a method of adjusting at least one variable communication parameter in a system for communicating with a transponder. The transponder is located in a moving vehicle travelling in a roadway. The transponder has a transponder memory for storing configuration type data. The communication system has at least one antenna having a coverage area that includes at least a portion of the roadway and a system memory having a database stored thereon. The database lists at least one predetermined communication parameter for each of at least two configuration types. The method comprises the steps of: (a) receiving at the antenna the configuration type data from the transponder memory; (b) looking up in the database the predetermined communication parameter that corresponds to the received configuration type data; and (c) adjusting at least one of the variable communication parameters for the communication system based on the predetermined communication parameter.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
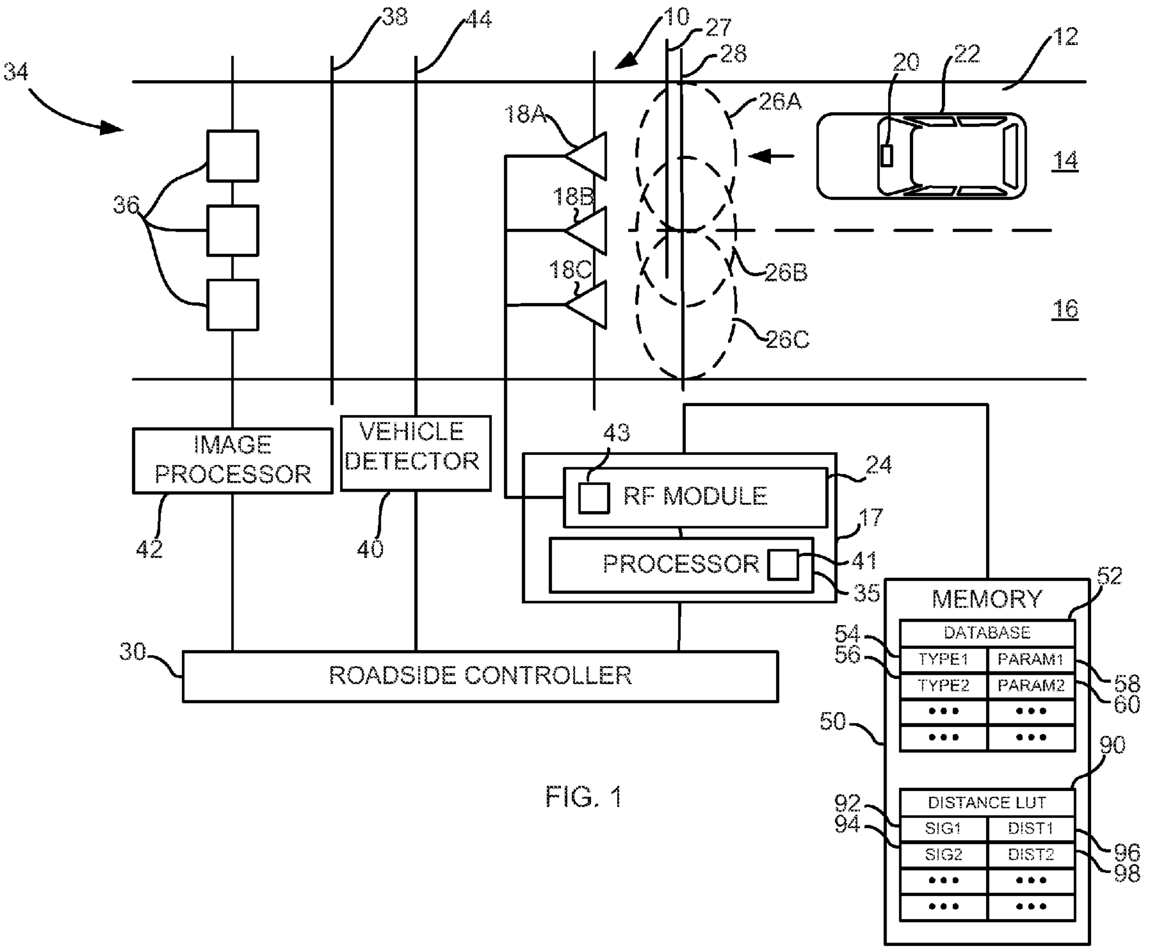
FIG. 1 shows a plan view and block diagram of an example embodiment of a communication system in a two-lane open road toll application.

With reference to FIG. 1, there is shown an embodiment of an electronic toll collection system having an adaptive communication system, illustrated generally by reference numeral 10. It will be appreciated by one skilled in the art that the electronic toll collection system may be used in a variety of applications. In one embodiment, the electronic toll collection system is associated with a gated toll plaza. In another embodiment, the system is associated with an open road toll processing zone. Other applications of the electronic toll collection system will be appreciated by those skilled in the art.

As shown in FIG. 1, the electronic toll collection system is applied to roadway 12 having first and second adjacent lanes 14 and 16. The roadway 12 may be a two lane access roadway leading towards or away from a toll highway. The electronic toll collection system 10 includes three roadway antennas 18A, 18B, and 18C, each of which is connected to a signal processing means, namely an Automatic Vehicle Identification ("AVI") reader 17. It will be appreciated that other antenna configurations may be used and the number of antennas or the number of lanes may be different than those illustrated in FIG. 1. For example, the exemplary embodiment of FIG. 1 could be modified to eliminate the midpoint antenna 18B so that only two roadway antennas 18A, 18C would be used to provide coverage to the two lanes 14 and 16. The antennas 18A, 18B, 18C may, in some embodiments, be mounted to an overhead gantry or other structure.

The AVI reader 17 is a control device that processes signals that are sent and received by the roadway antennas 18A, 18B, and 18C, and includes a processor 35 and a Radio Frequency ("RF") module 24.

The RF module 24 is configured to modulate signals from the processor 35 for transmission as RF signals over the roadway antennas 18A, 18B and 18C, and to de-modulate RF signals received by the roadway antennas 18A, 18B and 18C into a form suitable for use by the processor 35. In this regard, the AVI reader 17 employs hardware and signal processing techniques that are well known in the art. The processor 35 includes a programmable processing unit, volatile and non-volatile memory storing instructions and data necessary for the operation of the processor 35, and communications interfaces to permit the processor 35 to communicate with the RF module 24 and a roadside controller 30.

The roadway antennas 18A, 18B and 18C and the AVI reader 17 function to trigger or activate a transponder 20 (shown in the windshield of vehicle 22) to record information and to acknowledge to the transponder 20 that a validated exchange has taken place. It will be appreciated by those skilled in the art that the transponder 20 may also be mounted in other locations on the vehicle 22, for example on the roof, the front grill, the license plate, etc. The roadway antennas 18A, 18B and 18C are directional transmit and receive antennas which, in the illustrated embodiment, have an orientation such that each of the roadway antennas 18A, 18B and 18C can only receive signals transmitted from a transponder 20 when the transponder 20 is located within a roughly elliptical coverage area associated with the antenna.

The roadway antennas 18A, 18B and 18C are located above the roadway 12 and arranged such that they have coverage areas 26A, 26B and 26C which are aligned along an axis 28 that is orthogonal to the travel path along roadway 12. In the embodiment illustrated, the major axis of the elliptical coverage areas 26A, 26B and 26C are co-linear with each other, and extend orthogonally to the direction of travel. As is apparent from FIG. 1, the coverage area 26A provides complete coverage of the first lane 14, and the coverage area 26C provides complete coverage of the second lane 16. The coverage area 26B overlaps both of the coverage areas 26A and 26C. The coverage area 26A, 26B, 26C of each antenna 18A, 18B, 18C includes at least a portion of the roadway.

It will be understood that although the coverage areas 26A, 26B and 26C are illustrated as having identical, perfect elliptical shapes, in reality the actual shapes of the coverage areas 26A, 26B and 26C will typically not be perfectly elliptical, but will have a shape that is dependent upon a number of factors, including RF reflections or interference caused by nearby structures, the antenna pattern and mounting orientation.

It will also be understood that, although elliptical coverage areas are disclosed in the above embodiment, other shapes could also be used for the coverage areas 26A, 26B or 26C.

The AVI reader 17 is connected to a roadside controller 30. In open road toll systems, the electronic toll collection system 10 will often include a vehicle imaging system, which is indicated generally by reference numeral 34. The imaging system 34 includes an image processor 42 which is connected to a number of cameras 36 arranged to cover the width of the roadway for capturing images of vehicles as they cross a camera line 38 that extends orthogonally across the roadway 12. The image processor 42 is connected to the roadside controller 30, and operation of the cameras 36 is synchronized by the roadside controller 30 in conjunction with a vehicle detector 40. The vehicle detector 40 which is connected to the roadside controller 30 detects when a vehicle has crossed a vehicle detection line 44 that extends orthogonally across the roadway 12, which is located before the camera line 38 (relative to the direction of travel). The output of the vehicle detector 40 is used by the roadside controller 30 to control the operation of the cameras 36. The vehicle detector 40 can take a number of different configurations that are well known in the art, for example it can be a device which detects the obstruction of light by an object.

Figure 2:
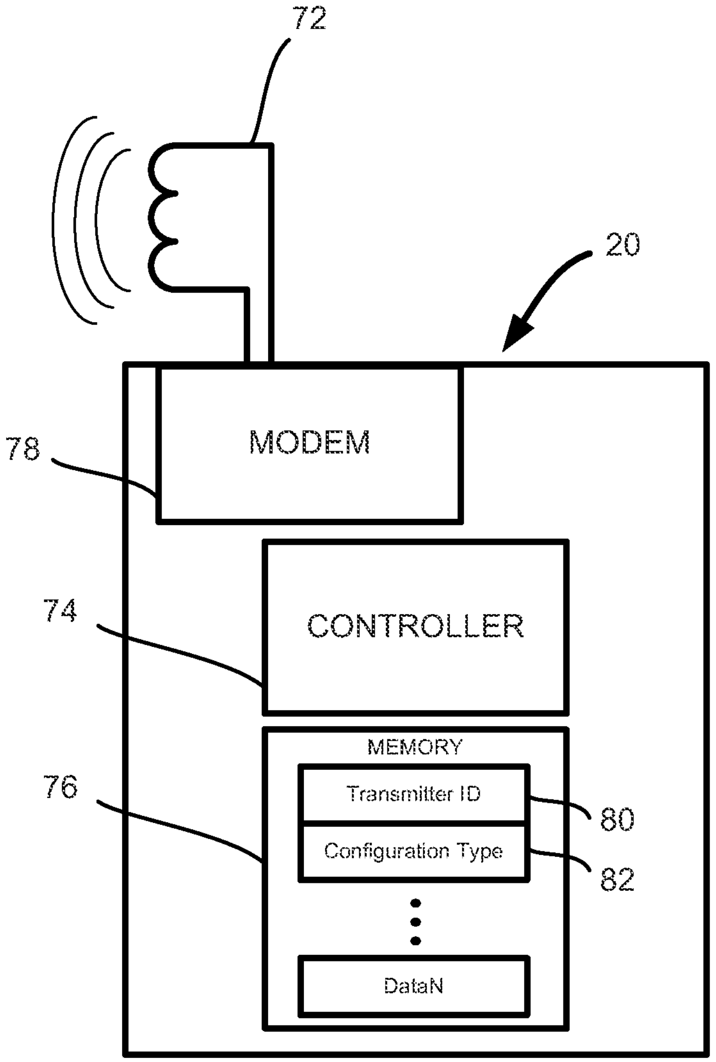
FIG. 2 shows a block diagram of a transponder for use with the communication system 10 of FIG. 1.

As shown in FIG. 1, the vehicle detection system utilizes a transponder 20 that is located in a vehicle 22 traveling on the roadway 12. Referring now to FIG. 2, the transponder 20 has a modem 78 that is configured to de-modulate RF signals received by a transponder antenna 72 into a form suitable for use by a transponder controller 74. The modem 78 is also configured to modulate signals from the transponder controller 74 for transmission as an RF signal over the transponder antenna 72.

The transponder 20 also includes a transponder memory 76 that is connected to the transponder controller 74. The transponder controller 74 may access the transponder memory 76 to store and retrieve data. The transponder memory 76 may be random access memory (RAM) or flash memory. In one embodiment, the transponder memory 76 is the integrated memory of a microcontroller.

The transponder memory 76 can be used to store configuration type data 82 for the vehicle 22 associated with the transponder 20 or for the transponder 20 itself. For example, the configuration type data 82 may include data relating to the vehicle 22 and/or the transponder 20 and/or the transponder mounting. In one embodiment, the configuration type data 82 may include the make and/or the model of the vehicle 22. For example, the configuration type data 82 may indicate that the vehicle 22 is a Honda™ Civic™. In another embodiment, the configuration type data 82 may include data representing the class of the vehicle 22. For example, the configuration type data 82 may indicate whether the vehicle 22 is an SUV, car, truck, van, mini-van, etc. The configuration type data 82 may also include data representing the size of the vehicle 22. For example, the configuration type data 82 may indicate whether the vehicle is a compact, small, medium, or large vehicle. The configuration type data 82 may also include data representing the weight and/or number of axles of the vehicle 22. In another embodiment, the configuration type data 82 may include data representing the type of the transponder 20, such as a model type. For example, the configuration type data 82 may indicate that the transponder 20 is a $3^{rd}$ generation flat-pack model. In another embodiment, the configuration type data 82 may include data representing the mounting location of the transponder 20 on the vehicle 22. For example, the configuration type data 82 may indicate that the transponder 22 is mounted on the vehicle 20 windshield, license plate, front grill, roof, etc. It will be appreciated by those skilled in the art that these embodiments and examples are not exhaustive and that the configuration type data 82 may comprise other data not specifically identified in the examples above.

The transponder memory 76 may also store other information which may be necessary for electronic toll-collection. For example, the transponder memory 76 may store a unique transponder identification number 80. The unique transponder identification number 80 may be transmitted by the transponder 20 as a part of any of its transmissions and used by the AVI reader 17 for determining the identity of the source of the transmission. The AVI reader 17 may also include the unique transponder identification number 80 in any transmission originating from the antennas 18A, 18B, and 18C and destined for the transponder 20 that corresponds to the unique identification number 80. In this way, the communication system 10 ensures that communications which are transmitted by the antennas 18A, 18B, or 18C that are intended to be received by a specific transponder 20 are disregarded by other transponders which share the coverage areas 26A, 26B, and 26C with the transponder 20.

The transponder 20 may be configured to cause the transponder antenna 72 to transmit at least some of the data stored in the transponder memory 76 upon the receipt of an appropriate signal from one of the roadway antennas 18A, 18B, and 18C. For example, in one embodiment the AVI reader 17 is configured to cause the roadway antennas 18A, 18B, and 18C to periodically transmit an interrogation signal. Upon receipt of the interrogation signal, the transponder controller 74 may read the contents of the transponder memory 76 and transmit at least some of the contents of the transponder memory 76 using the transponder antenna 72. In some cases, the transponder controller 74 will be configured to cause the transponder antenna 72 to transmit all of the contents of the transponder memory 76 in response to the receipt of an interrogation signal from one of the roadway antennas 18A, 18B or 18C.

Referring again to FIG. 1, the adaptive communication system 10 includes a system memory 50 connected to the AVI reader 17. The system memory 50 includes a database 52 which associates at least one predetermined communication parameter 58, 60 with various configuration types 54, 56. In some embodiments, more than one predetermined communication parameter 58, 60 may be listed for each configuration type 54, 56. The database 52 contains data associated with at least two types of configurations. For example, it may contain data associated with two or more vehicle 22 types and/or data associated with two or more transponder 20 types and/or data associated with two or more transponder mounting location types.

The predetermined communication parameters 58, 60 represent variables which may be altered by the communication system 10 in order to provide a greater likelihood of a successful communication between the communication system 10 and the transponder 20. The predetermined communication parameters 58 and 60 include variables that have a tendency to vary for different types of vehicles, transponders and/or mounting locations.

In one embodiment the predetermined communication parameter 58 or 60 represents a predetermined communication position 27 for the transponder 20 if the transponder 20 is located in a vehicle 22 of a specified type. For example, the predetermined communication parameter 27 may be ten feet from one of the roadway antennas 18A, 18B or 18C if the vehicle type is a sports utility vehicle.

In another embodiment, the predetermined communication parameter 58 or 60 represents the transmit power level or levels of the roadway antennas 18A, 18B and 18C. In yet a further embodiment, the predetermined communication parameter 58, 60 represents the receive sensitivity or sensitivities of the roadway antennas 18A, 18B, and 18C when they are receiving transmissions from the transponder 20. The receive sensitivity is a measure of how faint a signal can be successfully received by the roadway antennas 18A, 18B, 18C.

In another embodiment, the predetermined communication parameter 58 or 60 may be an expected threshold of successful interrogation responses for use in lane assignment techniques such as those described in U.S. Pat. No. 6,219,613 and U.S. Pat. No. 7,385,525 both of which are incorporated herein by reference.

The predetermined communication parameters 58 and 60 for various types of vehicles, transponders and/or mounting locations may be determined in a controlled test environment or may be determined by compiling data at the communications system 10 installed on the roadway 12. In either case, the predetermined communication parameters 58 and 60 may be determined by periodically adjusting a variable communication parameter and monitoring whether the adjustment has enhanced or decreased the likelihood of successful communications between the communication system 10 and the transponder 20.

For example, for the embodiment in which the predetermined position communication parameters 58 and 60 represent a predetermined communication position 27 of the transponder 20, the predetermined communication position 27 for a given transponder 20 may be determined by monitoring the change in the received signal strength at the transponder 20 at various distances.

Figure 3:
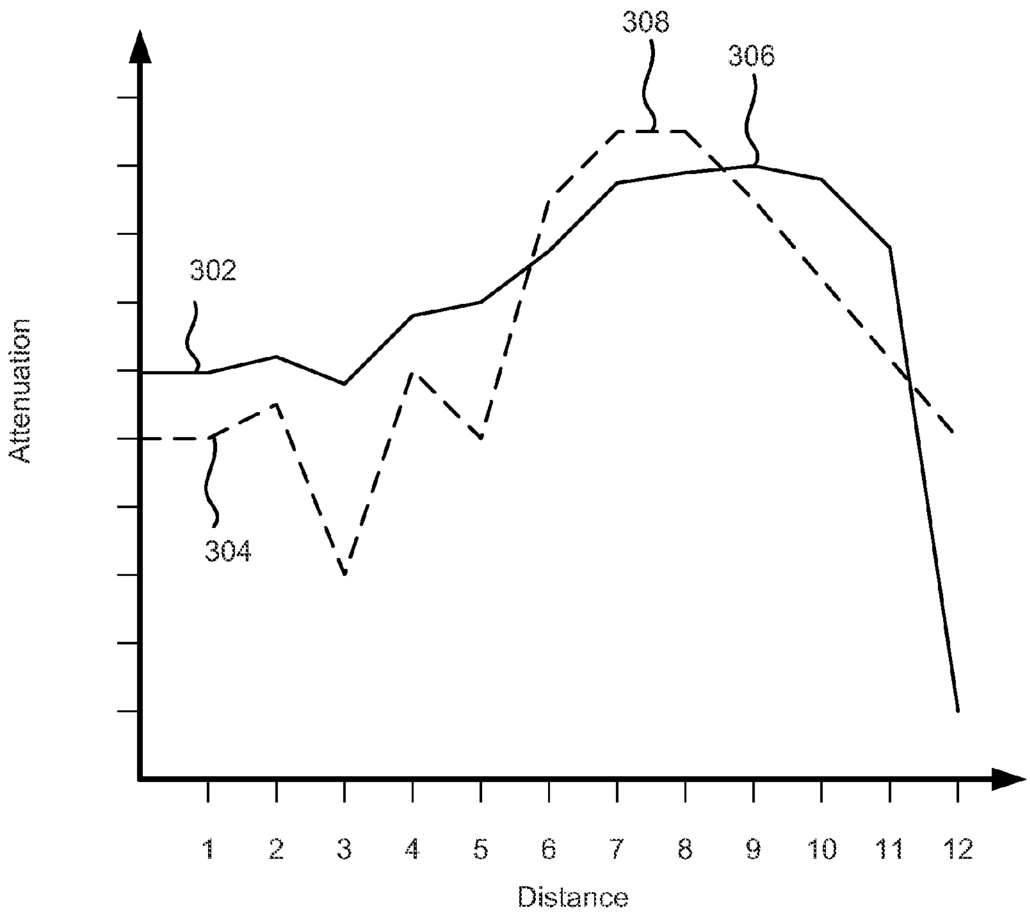
FIG. 3 is a graph showing how signal strength varies with distance for two types of vehicles.

For example, referring now to FIG. 3, an exemplary graph is shown illustrating the signal strength of communications with transponders 20 which are located in vehicles 22 of two different types. A first data line 302 illustrates the signal strength of communication signals received at a transponder 20 located in a vehicle of a first type and a second data line 304 illustrates the signal strength of communication signals received at a transponder 20 located in a vehicle of a second type. Communications with the transponder in the vehicle of the first type have a peak signal strength at a point 308 which occurs when the transponder is between 7 and 8 feet from the antenna 18A, 18B, 18C. Communications with the transponder in the vehicle of the second type have a peak signal strength at a point 306 which occurs when the transponder is approximately 9 feet from the antenna 18A, 18B, 18C. The AVI reader 17 would then be configured to attempt to program transponders 20 that are located in vehicles of the first type when the transponder 20 is between 7 and 8 feet from the antenna 18A, 18B, 18C and to attempt to program transponders 20 that are located in vehicles of the second type when the transponder 20 is 9 feet from the antenna.

In operation, in response to the receipt of configuration type data 82 from the transponder 20, the AVI reader 17 is configured to determine from the database 52 the predetermined communication parameters 58, 60 corresponding to the received configuration type data 82. The AVI reader 17 is configured to subsequently adjust at least one variable communication parameter based on the predetermined communication parameters 58, 60 determined to correspond to the received configuration type data 82.

The AVI reader 17 may contain at least one attenuator 43. In some embodiments, the predetermined communication parameter 58, 60 and at least one variable communication parameter for each type 54, 56 represent the transmit power level of one or more of the antennas 18A, 18B, 18C. That is, the predetermined communication parameter 58, 60 in the database 52 is a predetermined transmit power level. The attenuator 43 may be used to adjust the transmit power level of one or more of the antennas based on the predetermined transmit power level in the database 52 which corresponds to the configuration type 54, 56.

The predetermined communication parameter 58, 60 and at least one variable communication parameter for each configuration type 54, 56 may also represent an antenna receive sensitivity of one or more of the antennas 18A, 18B, 18C. That is, the predetermined communication parameter 58, 60 in the database 52 is a predetermined antenna receive sensitivity. The attenuator 43 may be used to adjust the antenna receive sensitivity of at least one of the antennas 18A, 18B, 18C based on the predetermined antenna receive sensitivity in the database 52 which corresponds to the configuration type 54, 56.

The database 52 is typically indexed by configuration type 54, 56. In embodiments where the configuration type data 82 comprises data representing the make and model of the vehicle, the database 52 may be indexed by vehicle make and/or model. In other embodiments, where the configuration type data 82 comprises data representing the transponder type (such as a make and/or model), the database 52 may be indexed by transponder type. In embodiments where the configuration type data 82 comprises data representing the transponder mount location, the database 52 may be indexed by transponder mount location. Similarly, in embodiments where the configuration type data 82 comprises data representing the size of the vehicle, the database 52 may be indexed by vehicle size. In embodiments where the configuration type data 82 comprises data representing the transponder type, the database 52 may be indexed by transponder type. In embodiments where the configuration type data 82 comprises data representing the class of the vehicle, the database 52 may be indexed by vehicle class. It will be appreciated by those skilled in the art that the indexing may be by both single parameter, e.g. vehicle type, and/or by compound parameter, e.g combination of vehicle type, transponder type and mounting location. Furthermore, it will be appreciated that the database may be indexed by other variables not specifically mentioned.

As discussed above, in another embodiment, the predetermined communication parameters 58 and 60 represent the predetermined communication position 27 of the transponder 20. The predetermined communication position 27 of the transponder 20 may be measured relative to the roadway antenna 18A, 18B or 18C. It will be appreciated, however, that the predetermined communication position 27 may be measured relative to other reference points. For example, the predetermined communication position 27 may be measured relative to a point of entry into the coverage area 26A, 26B, 26C upstream from the antennas 18A, 18B, 18C.

Where the communication parameters 58, 60 represent the predetermined communication position 27 of the transponder 20, the AVI reader 17 may contain a vehicle position tracking module for tracking the position of the transponder 20 and communicating with the transponder 20 during a time slot during which the transponder 20 is in the predetermined communication position. The vehicle position tracking module may use predictive algorithms in order to determine when the transponder 20 will be in the predetermined communication position 27.

In the embodiment in which the predetermined communication parameters 58 and 60 represent the predetermined communication position 27 of the transponder, the system 10 may include a vehicle velocity determining module 41 for determining and reporting a velocity of the vehicle to the AVI reader 17.

In some embodiments, the vehicle velocity determining module 41 may be included in the AVI reader 17. For example, the vehicle velocity determining module 41 may be implemented using the processor 35 in the AVI reader 17. In other embodiments, the vehicle velocity determining module may be physically distinct from the AVI reader 17.

In some embodiments, the velocity of the vehicle 22 will be considered to be vehicle specific. That is, the vehicle velocity determining module 41 determines the velocity of the specific vehicle 22 carrying the transponder 20. In other embodiments, the velocity of the vehicle will not be considered to be vehicle specific and the speed of traffic will be determined based on the prevailing traffic speed of the roadway. Information regarding the speed of traffic in the roadway may be input to the vehicle velocity determining module 41 from an external source. For example, the vehicle velocity determining module 41 may receive roadway traffic speed data from an external system that measures the traffic speed. Such an external system may rely upon roadway sensors, radar guns, laser guns, or other mechanisms for determining the speed of vehicles. In another embodiment, the vehicle traffic velocity may be provided by a third-party entity, such as a municipal or regional traffic authority. In other embodiments, the vehicle velocity determining module 41 determines the velocity of traffic by examining the number of times the AVI reader 17 has communicated with a vehicle 22. The AVI reader 17 may determine the velocity of traffic from the number of communications and a known size of the coverage areas 26A, 26B, 26C. It will be appreciated that other methods of determining the velocity of a vehicle 22 are also possible.

In some embodiments, the control device may determine the time slot during which the transponder 20 will be in the position corresponding to the predetermined communication position 27 based on the velocity of the vehicle 22 and the predetermined communication position 27. For example, the control device may determine the appropriate time slot using the formula:

$$\text{Time} = \frac{\text{Velocity}}{\textit{Dist.}}$$

In some embodiments, the predetermined communication position 27 in the database 52 will be measured relative to the point of entry of a vehicle into the coverage areas 26A, 26B, 26C. That is, it will be at a point upstream of the antennas 18A, 18B, 18C at the periphery of the coverage area 26A, 26B, 26C. The AVI reader 17 may determine the time at which the AVI reader 17 first receives a response from a transponder 20 following the transmission of an interrogation signal. That is, the AVI reader 17 may determine an approximate time at which the transponder 20 enters the coverage area 26A, 26B, 26C. Using the velocity of the vehicle, the time at which the response signal is first received, and the distance from the point of entry to the predetermined communication position

27, it is possible to determine an approximate time at which the transponder 20 will be in the predetermined communication position 27.

In some embodiments, the AVI reader 17 may include a signal power level sensing module for determining the signal power level of a signal transmitted by the transponder 20 and received by the roadway antennas 18A, 18B, 18C. Since the received signal strength varies with the distance between the transponder 20 and the roadway antennas 18A, 18B, 18C, the signal power level sensing module may be used to determine an approximate distance of the transponder 20 from the roadway antennas 18A, 18B or 18C. In other embodiments, the AVI reader 17 is configured to determine an approximate position of the transponder 20 based on the signal power level of signals received periodically from the transponder 20 at the antennas 18A, 18B, 18C. The AVI reader 17 is configured to determine the time slot during which the transponder 20 will be in the predetermined communication position 27 based on the approximate position of the transponder and the velocity of the vehicle 22 at the time at which the transmission from the transponder 20 was received.

As noted previously, the signal strength may be measured using a signal power level sensing module connected to the roadway antennas 18A, 18B, or 18C. In this case, the signal strength of the signal that is transmitted by the transponder 20 in response to the interrogation signal may be measured. In another embodiment, the transponder 20 may include a signal power sensing means to measure the signal strength of the interrogation signal itself. The transponder 20 may communicate the signal strength data to the communication system 10 as part of its response to the interrogation signal.

The signal power sensing module in the AVI reader 17 or signal power sensing means in the transponder 20 may be of any type suitable for determining a signal strength level of an analog signal. For example, in one embodiment, the signal power sensing module in the AVI reader 17 or the signal power sensing means in the transponder 20 may be an analog to digital converter. The analog to digital converter determines a signal power level in order to determine whether a signal is above or below a threshold (and is therefore a one or a zero). In some embodiments, the analog to digital converter may report the signal power level of a received signal to the processor 35.

In either case, the signal strength may be used to approximate the distance of the vehicle 22 to the roadway antenna 18A, 18B, or 18C. That is, the signal strength will typically vary with the distance of the transponder 20 to the roadway antennas 18A, 18B, 18C. As shown in FIG. 1, in order to permit the signal strength to be translated into a distance, the memory 50 may include a distance look up table 90. The distance look up table 90 may be indexed by signal strength values 92, 94. For each signal strength value 92 and 94, the distance look up table 90 has a corresponding estimated distance value 96, 98 assigned. In some instances, the signal strength that is measured by the signal strength sensor may be in between the signal strength values 92, 94 in the distance look up table 90. In this case, a distance value may be calculated by interpolation. For example, the distance may be calculated using the formula:

$$dist = \left(\frac{\text{meas\_sig} - \text{low\_sig}}{\text{high\_sig} - \text{low\_sig}}\right)(\text{high\_dist} - \text{low\_dist}) + \text{low\_dist}$$

where meas_sig is the measured signal strength; high_sig is the signal strength value 92 or 94 in the distance look up table 90 which is immediately higher than the measured signal strength; low_sig is the signal strength value 92 or 94 which is immediately lower than the measured signal strength; high_dist is the distance value 96 or 98 corresponding to the signal strength value 92 or 94 which is immediately higher than the measured signal strength; and low_dist is the distance value 96 or 98 corresponding to the signal strength value 92 or 94 which is immediately lower than the measured signal strength.

The distance values 96 and 98 for various signal strengths 92 and 94 are typically determined in a controlled test environment.

While FIG. 1 depicts an embodiment wherein the distance look up table 90 is implemented using the same system memory 50 as the database 52, it will be appreciated that more than one memory device may be used to implement these features.

The AVI reader 17 receives the measured power level from the signal power level sensing module and looks up the corresponding distance value 96 or 98 in the memory. The AVI reader 17 may also be used to perform interpolation calculations as required and as specified above.

In some embodiments, the memory 50 will have more than one distance look up table 90. The memory 50 may have one distance look up table 90 for each of the various classes of configuration type. In this embodiment, the AVI reader 17 relies on the configuration type data 82 received from the transponder 20 by one of the roadway antennas 18A, 18B, or 18C. The AVI reader 17 uses the distance look up table that corresponds to the configuration type data 82 to look up the distance value 96 or 98 which corresponds to the signal strength value 92 or 94.

It will be appreciated that other methods may be employed to determine an approximate distance based on the power level. For example, the approximate distance may be calculated by solving the formula for free space path loss (FSPL) for distance:

$$\text{FSPL (dB)} = 32.44 + 20\log(\text{Transmission\_Frequency (MHz)}) + 20\log(\text{distance (km)})$$

Free space path loss may be determined as the difference between the transmit power and the received signal power for communications between the transponder 20 and the antennas 18A, 18B, 18C.

In some instances, the AVI reader 17 may determine that the transponder 20 will be at the predetermined communication position 27 during a time slot which has already been reserved for communications with another vehicle. To ensure that the AVI reader 17 does not reserve a slot in which the transponder 20 has left the coverage area 26A, 26B, 26C, the AVI reader 17 may be configured to reserve an adjacent time slot. The AVI reader 17 may be configured to reserve an earlier adjacent time slot.

In some embodiments, the communication system 10 also includes a vehicle lateral position determination system for determining a lateral position of the vehicle. That is, the vehicle lateral position determination system determines which antenna 18A, 18B, 18C is most appropriate for communicating with the transponder 20. For example, in the example shown in FIG. 1, the first antenna 18A would likely be best suited for communicating with the transponder 20 since the coverage area of the first antenna 18A best covers the path of travel of the vehicle 22. In systems which include a vehicle lateral position determination system, the AVI reader 17 may be configured to adjust the variable communication parameters for the antenna 18A, 18B, 18C that corresponds to the lateral position of the vehicle 22.

With reference to FIG. 1 and the flow chart of FIG. 4, the operation of the communication system 10 will now be described for a system in which the predetermined communication parameter 58, 60 represents a transmit power level or a receiver sensitivity. The AVI reader 17 is configured to repeatedly perform interrogation cycles. In particular, the AVI reader 17 is programmed so that during each interrogation cycle all of the first to "nth" coverage areas of the communication system 10 are subsequently interrogated in time division multiplex manner. In the case of the communication system 10 shown in FIG. 1, only three coverage areas 26A, 26B and 26C need be interrogated, and accordingly for such system, n=3. As shown in steps 202, 204 and 206 of FIG. 4, after the transmission of an interrogation signal on a given roadway antenna 18A, 18B, or 18C, the roadway antennas 18A, 18B, and 18C and the AVI reader 17 will listen for a response from the transponder 20. If no response is received, an interrogation signal will be transmitted on another roadway antenna 18A, 18B, or 18C (Steps 206, 202).

If a response to the interrogation signal is received at one of the roadway antennas 18A, 18B, 18C, the communication system 10 may attempt to determine the lane location of the transponder 20. It will be appreciated by a person skilled in the art that, since the coverage areas 26A, 26B, and 26C of the antennas 18A, 18B and 18C may be partially overlapping, more than one antenna 18A, 18B or 18C may receive the transponder 20 response to the interrogation signal. In some embodiments, it is desirable to determine which of the antennas 18A, 18B or 18C is best suited for sending and receiving communications to the transponder 20 (Step 208). A vehicle lateral position determination system may be used to determine the lateral position of the vehicle 22 and/or which of the antennas 18A, 18B or 18C is best suited for communicating with the transponder 20. Various methods are known for determining which antenna is best suited for transmission. In many of these methods the communication system 10 will only attempt to determine the lane position of the vehicle 22 after a number of handshakes between the transponder 20 and the communication system 10. In one embodiment, the signal power level sensing module may be used to determine which roadway antenna 18A, 18B, or 18C is receiving the strongest communication signal from the transponder 20. In this embodiment, the preferred antenna roadway 18A, 18B, or 18C for transmitting signals to the transponder 20 will be the roadway antenna 18A, 18B, or 18C which has received the strongest communication signal from the transponder 20.

The response to the interrogation signal typically includes the data stored in the transponder memory 76 including the transponder identification number 80 and the configuration type data 82. The configuration type data 82 in the transponder memory 76 corresponds to one of the various configuration types 54 or 56 in the memory 50 of the communication system 10.

Figure 4:
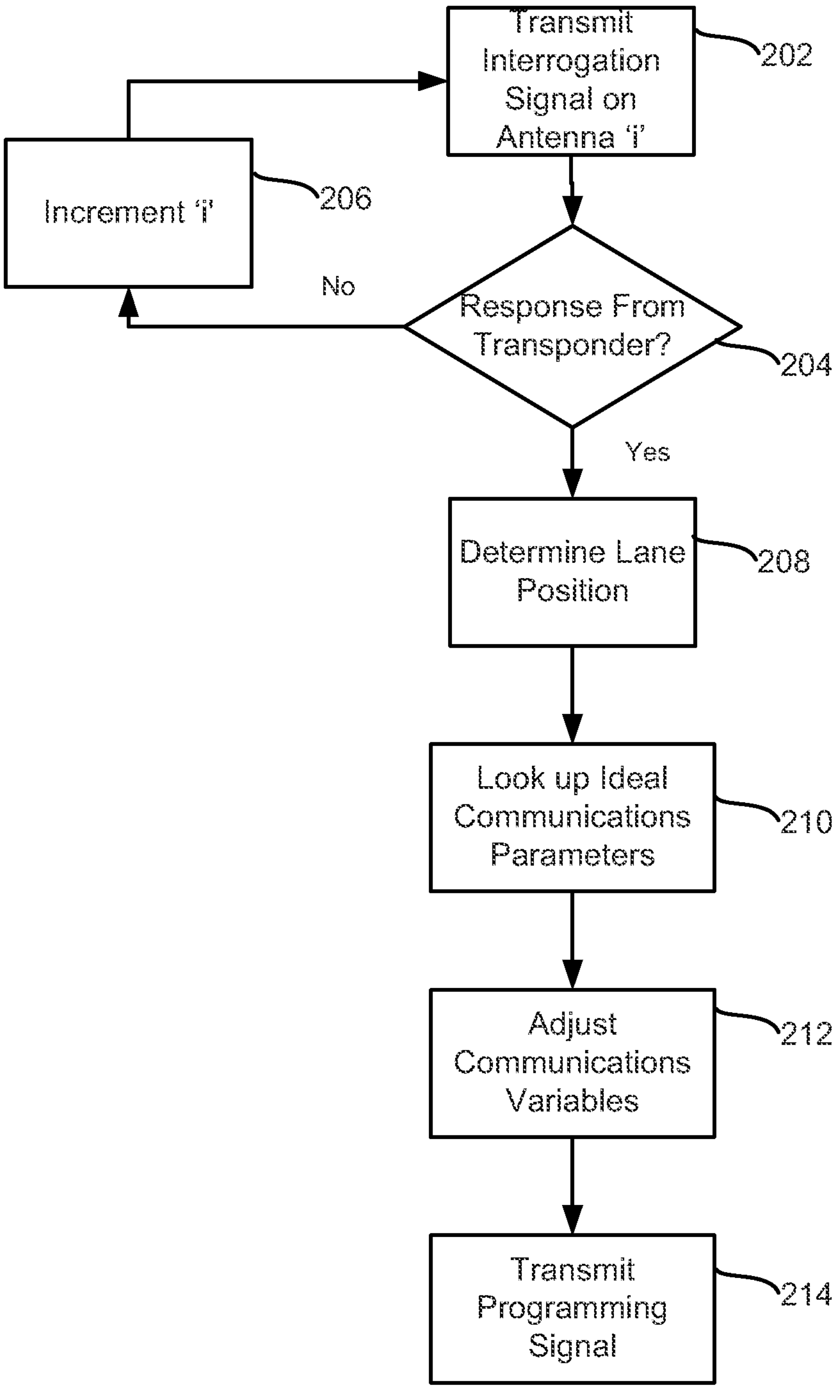
FIG. 4 is a flowchart showing the operation of the communication system of FIG. 1 in a system where the transmit power level or receiver sensitivity of antennas in the communication system are varied.

At step 210 of the method illustrated in FIG. 4, the communication system 10 looks up the predetermined communication parameter 58 or 60 that corresponds to the configuration type data 82 in the memory 50 of the communication system 10. In some embodiments, more than one communication parameter corresponds to each configuration type 54 or 56. For example, each configuration type may have a predetermined communication parameter representing the receiver sensitivity level, and another predetermined communication parameter representing the transmit power level.

At step 212, the AVI reader 17 adjusts variable communication parameters of the communication system 10 using the predetermined communication parameters 58 or 60. Where the predetermined communication parameters 58 or 60 represent the transmit power level, the attenuators 43 may be used to adjust the power level of the roadway antennas 18A, 18B, and 18C. Similarly, where the predetermined communication parameters 58 or 60 represent the receiver sensitivity of the roadway antennas 18A, 18B, or 18C, attenuators 43 may be used to adjust the sensitivity of one or more of the antennas 18A, 18B, and 18C. It will be appreciated that, in some embodiments, the adjustment may be made to all antennas 18A, 18B, 18C and that, in other embodiments, the adjustment is only made to a subset of all available antennas 18A, 18B, or 18C. For example, in some embodiments, the adjustment is only made to one antenna.

In one embodiment the variable communication parameter is only adjusted for one roadway antenna 18A, 18B, or 18C. Here, the variable communication parameter may only be adjusted for the roadway antenna 18A, 18B, or 18C which is determined at step 208 to be best suited for communicating with the transponder 20 due to the lane position of the vehicle 22.

In a typical electronic toll collection system, the method will include a step of updating data in the transponder. This data may be a record of passage, to be retrieved at a subsequent toll location to be used to compute the toll fee. This data may also be commands to activate the audio & visual indicators on the transponder. The communication system 10 may transmit a programming signal to the transponder 20. The programming signal may include, for example, the current plaza and lane number to be stored to the transponder memory 76. In step 214, the communication system 10 is used to transmit a programming signal to the transponder 20 using at least one of the roadway antennas 18A, 18B or 18C. In one embodiment, the communication system 10 may transmit the programming signal to the transponder 20 using the roadway antenna 18A, 18B or 18C that is selected at step 208 to be best suited for communicating with the transponder 20. Upon receipt of the programming signal by the transponder 20, the transponder 20 will program at least some of the data embedded in the programming signal to the transponder memory 76.

Figure 5:
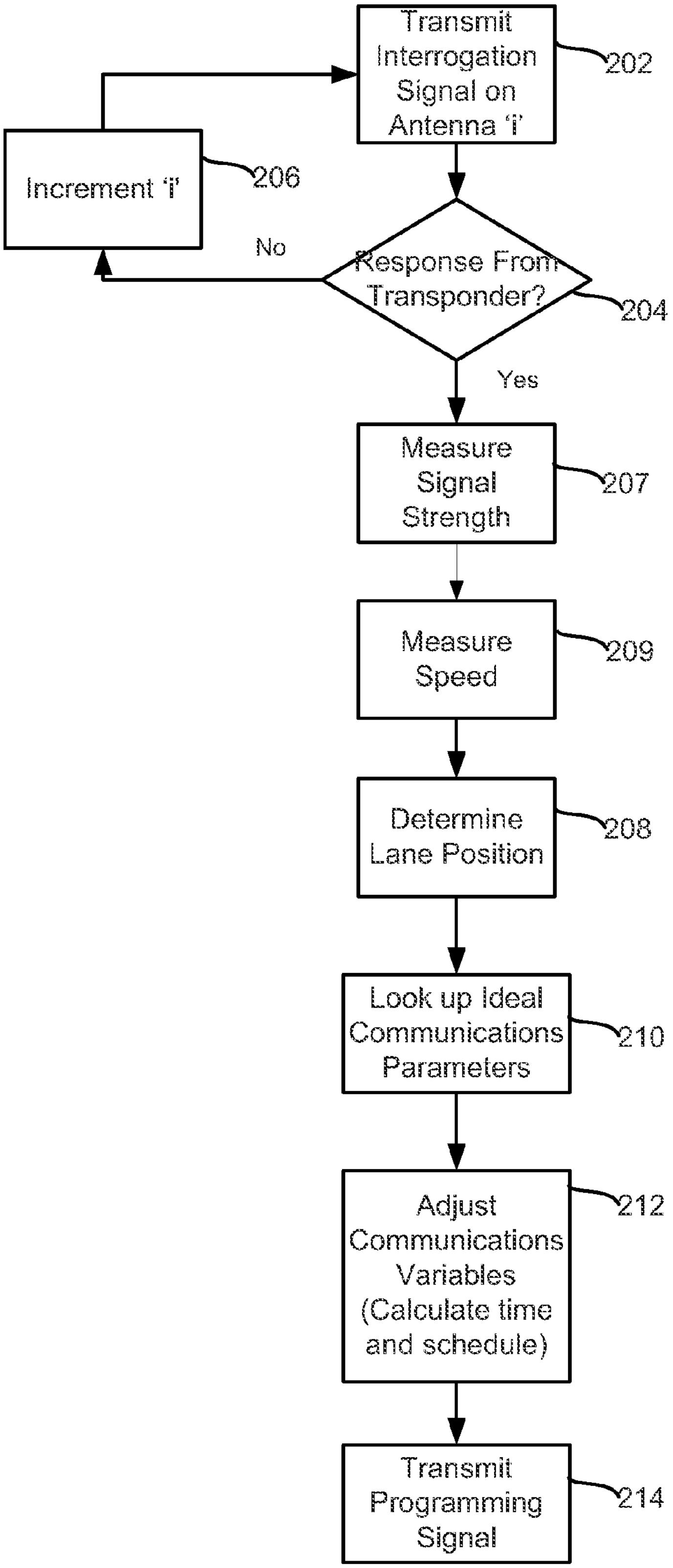
FIG. 5 is a flowchart showing the operation of the communication system of FIG. 1 in a system where communications are scheduled to maximize the probability of successful communications.

Referring now to FIG. 5 and FIG. 1, the operation of the communication system 10 will now be discussed for an embodiment in which the predetermined communication parameter 58 or 60 is a predetermined communication position 27 for the transponder 20. The predetermined communication position 27 for the transponder 20 is the position at which the transponder 20 in the vehicle 22 is at a distance from the roadway antennas 18A, 18B, or 18C which will maximize the likelihood of successful communications between the roadway antennas 18A, 18B, or 18C and the transponder 20. The predetermined communication position 27 will vary based on the type of the vehicle 22.

As will be noted from FIGS. 4 and 5, the method wherein the predetermined communication parameter 58 or 60 is the predetermined communication position 27 for the transponder 20 is similar to the method discussed above where the predetermined communication parameter 58 or 60 is the transmit power level of the roadway antennas 18A, 18B, and 18C or the receive sensitivity of the roadway antennas 18A, 18B, 18C. In the method where the predetermined communication parameter 58 or 60 is the predetermined communication position 27 for the transponder 20, there may be a step 207 of measuring the signal strength of communications between the transponder 20 and the roadway antennas 18A, 18B, or 18C.

At step 209 of the method illustrated in FIG. 5, the communication system 10 measures the speed of the vehicle 22 carrying the transponder 20.

At step 212 of the method illustrated in FIG. 5, the AVI reader 17 adjusts variable communication parameters of the communication system 10 using the predetermined communication parameters 58 or 60. In this embodiment, the AVI reader 17 calculates a time slot during which the communication system 10 may attempt to program the transponder 20. The AVI reader 17 calculates the time period after which the transponder will be in the predetermined communication position 27 using the vehicle velocity and the distance value which was determined using the measured signal strength and the distance look up table 90. For example, the time may be determined using the formula:

$$\text{Time} = \frac{d2 - d1}{v}$$

where d2 is the distance of the transponder 20 from the antennas 18A, 18B, 18C when the signal strength was measured, as determined by the distance look up table 90; d1 is the predetermined communication position 27 of the transponder; and v is the velocity of the vehicle. As discussed above, other predictive algorithms may also be used.

Typically, where there is more than one measured signal strength (i.e. the transponder 20 is in more than one coverage area 26A, 26B and/or 26C) for a given transponder, the time calculations will be performed using the measured signal strength which is the greatest. In other embodiments, the time calculations will be performed using the signal strength that is measured at the roadway antenna 18A, 18B, or 18C which was selected at step 208 to be the best antenna for communicating with the transponder 20 due to the lane position of the transponder 20.

After the AVI reader 17 has calculated the time at which the transponder 20 in the vehicle 22 will likely be in the predetermined communication position 27, it reserves a time slot with the roadway antenna 18A, 18B or 18C which was determined at step 208 to be the most suitable antenna for communicating with the transponder 20. If the desired time slot is already reserved, the AVI reader 17 may be configured to select the nearest unreserved time slot for that roadway antenna 18A, 18B or 18C.

It will be appreciated that, while in the exemplary embodiment of FIG. 1 the AVI reader 17 is illustrated as being implemented as a single unit, the components that make up the AVI reader 17 may be physically separated. For example, the attenuator 43 may be mounted on the gantry in close proximity to the antennas 18A, 18B, 18C.

Certain adaptations and modifications of the invention will be obvious to those skilled in the art when considered in light of this description. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An adaptive communication system for communicating with a transponder located in a moving vehicle travelling on a roadway, the transponder having a transponder memory to store configuration type data, the system comprising:

at least one antenna having a coverage area that includes at least a portion of the roadway, the at least one antenna to receive an RF signal modulated by the configuration type data from the transponder memory;

a system memory having a database stored thereon, the database listing at least one predetermined communication parameter for each of at least two types of configurations; and a control device connected to the at least one antenna and the system memory, the control device to demodulate the RF signal to obtain the configuration type data, to identify, based on the configuration type data, the predetermined communication parameters corresponding to the configuration type data, and to subsequently adjust at least one variable communication parameter based on the predetermined communication parameters identified based on the received configuration type data.

2. The adaptive communication system of claim 1, wherein the configuration type data includes at least one of a vehicle type, a vehicle size, a transponder type or a transponder mounting location.

3. The adaptive communication system of claim 1, wherein at least one of the predetermined communication parameters for each type of configuration and at least one of the variable communication parameters represent a transmit power level and wherein the control device comprises at least one attenuator to adjust the transmit power level of at least one of the at least one antenna.

4. The adaptive communication system of claim 1, wherein at least one of the predetermined communication parameters for each type of configuration and at least one of the variable communication parameters represent an antenna receive sensitivity and wherein the control device comprises at least one attenuator to adjust the antenna receive sensitivity of at least one of the at least one antenna.

5. The adaptive communication system of claim 1, wherein the configuration type data comprises data representing the make and model of the vehicle and wherein the database is indexed by vehicle make and model.

6. The adaptive communication system of claim 1, wherein the configuration type data comprises data representing the size of the vehicle and wherein the database is indexed by vehicle size.

7. The adaptive communication system of claim 1, wherein the configuration type data comprises data representing the transponder type, and wherein the database is indexed by transponder type.

8. The adaptive communication system of claim 1, wherein the configuration type data comprises data representing the transponder mounting location on the vehicle, and wherein the database is indexed by transponder mounting location.

9. The adaptive communication system of claim 1 wherein the predetermined communication parameters improve the likelihood of successful communications with the transponder.

10. The adaptive communication system of claim 1, wherein at least one of the predetermined communication parameters represents a communication position of the transponder and at least one of the variable communication parameters represents a time slot for communicating with the transponder, wherein the control device is further to track the position of the transponder and communicate with the transponder in a time slot during which the transponder is in a position corresponding to the communication position.

11. The adaptive communication system claimed in claim 10, wherein the control device is further to cause the at least one antenna to periodically transmit an interrogation signal and wherein the transponder is to transmit a response signal containing at least some of the contents of the transponder memory in response to receipt of an interrogation signal.

12. The adaptive communication system in claim 11, further comprising a vehicle velocity determining module to determine and report a velocity of the vehicle to the control device, the control device to determine the time slot during which the transponder is in the position corresponding to the communication position based on a time at which the response signal is first received from the transponder and the velocity of the vehicle and the communication position.

13. The adaptive communication system in claim 12, wherein the communication position is a distance from a point of entry of the coverage area.

14. The adaptive communication system in claim 11, further comprising:

a vehicle velocity determining module to determine and report a velocity of the vehicle to the control device; and a signal power level sensing module for sensing and reporting to the control device a power level of a transmission from the transponder is received by at least one of the at least one antenna, wherein the control device is to determine the approximate position of the transponder based on the signal power level, and wherein the control device is to determine the time slot during which the transponder is in the position corresponding to the communication position based on the approximate position of the transponder and the velocity of the vehicle and the time at which the transmission from the transponder was received.

15. The adaptive communication system in claim 14, wherein the system memory contains a look-up-table for translating at least one power level into an approximate position of the transponder.

16. The adaptive communication system claimed in claim 15, wherein the control device is to interpolate within the look-up-table if the power level is not listed in the distance look up table.

17. The adaptive communication system of claim 10, wherein the control device is to reserve an adjacent time slot if the time slot is already reserved.

18. The adaptive communication system of claim 1, wherein the control device further comprises a vehicle lateral position determination system in communication with the control device to determine a lateral position of the vehicle in the roadway, wherein the control device is to adjust the variable communication parameters for the at least one antenna that corresponds to the lateral position of the vehicle.

19. A method of adjusting at least one variable communication parameter in a system for communicating with a transponder, the transponder being located in a moving vehicle travelling in a roadway, the transponder having a transponder memory for storing configuration type data, the communication system having at least one antenna having a coverage area that includes at least a portion of the roadway and a system memory having a database stored thereon, the database listing at least one predetermined communication parameter for each of at least two configuration types, the method comprising:

receiving at the antenna an RF signal modulated by the configuration type data from the transponder memory;

demodulating the RF signal to obtain the configuration type data;

looking up in the database a first one of the at least one predetermined communication parameters that corresponds to the received configuration type data; and adjusting at least one of the variable communication parameters for the communication system based on the first predetermined communication parameter.

20. The method of claim 19, wherein the configuration type data includes at least one of a vehicle type, a vehicle size, a transponder type or a transponder mounting location.

21. The method of claim 19, wherein the first predetermined communication parameter represents a transmit power level of the antenna, and further comprising:

adjusting the transmit power level of the antenna.

22. The method of claim 19, wherein the first predetermined communication parameter represents a receive sensitivity of the antenna, and further comprising:

adjusting the receive sensitivity of the antenna.

23. The method of claim 19, further comprising:

determining which of the at least one antenna is best positioned to communicate with the transponder; and adjusting the variable communication parameter for the antenna that is best suited for communicating with the transponder.

24. The method of claim 19, wherein the first predetermined communication parameter represents a communication position of the transponder, and further comprising:

determining a time slot during which the transponder will be in the position corresponding to the communication position based on the velocity of the vehicle.

25. The method of claim 24, further comprising:

determining the time of entry of the transponder into the coverage area; and determining a velocity of the vehicle, and wherein determining the time slot further comprises calculating the time slot based on the velocity of the vehicle and the time of entry of the transponder into the coverage area and the communication position.

26. The method of claim 24, further comprising:

determining a signal power level of a signal received from the transponder;

determining the time of receipt of the signal from the transponder; and determining the velocity of the vehicle, wherein determining a time slot further comprises calculating the time slot based on the signal power level and the time of receipt and the velocity of the vehicle.

27. The method of claim 26, wherein the system memory contains a look-up-table for translating at least one power level into an approximate position of the transponder, and further comprising:

looking up in the distance look up table the approximate position which corresponds to the signal power level.

* * * * *

UNITED STATES PATENT AND TRADEMARK OFFICE

CERTIFICATE OF CORRECTION

PATENT NO. : 8,508,341 B2
APPLICATION NO. : 12/727964
DATED : August 13, 2013
INVENTOR(S) : Japjeev Kohli et al.

It is certified that error appears in the above-identified patent and that said Letters Patent is hereby corrected as shown below:

On the Title Page

Item (73) Assignee: replace "Mar IV Industries Corp.," with --Mark IV Industries Corp.,--

Signed and Sealed this
Third Day of December, 2013

Margaret A. Focarino

Margaret A. Focarino
*Commissioner for Patents of the United States Patent and Trademark Office*